United States Patent

Kalopissis et al.

[11] 3,918,896
[45] Nov. 11, 1975

[54] DYE COMPOSITION FOR KERATINIC FIBERS CONTAINING AN OXIDATION BASE AND A META-AMINOPHENOL COUPLER

[75] Inventors: Gregoire Kalopissis, Paris; Andree Bugaut, Boulogne-sur-Seine, both of France

[73] Assignee: Societe Anonyme dite: L'Oreal, Paris, France

[22] Filed: June 24, 1974

[21] Appl. No.: 482,558

[30] Foreign Application Priority Data
June 22, 1973 France .................. 73.67861

[52] U.S. Cl. .............. 8/10.2; 8/11; 8/32; 261/575
[51] Int. Cl.² .................. A61K 7/13
[58] Field of Search ......... 260/575; 8/10.2, 11, 32

[56] References Cited
UNITED STATES PATENTS

| | | | |
|---|---|---|---|
| 3,210,252 | 10/1965 | Blanke et al. | 8/10.2 |
| 3,216,899 | 11/1965 | Wilmsmann | 8/10.2 |
| 3,415,608 | 12/1968 | Tucker | 8/10.2 |
| 3,591,323 | 7/1971 | Kalopissis et al. | 260/575 X |
| 3,694,138 | 9/1972 | Kalopissis et al. | 8/10.2 |
| 3,697,215 | 10/1972 | Kalopissis et al. | 8/10.2 |

FOREIGN PATENTS OR APPLICATIONS 1,048,790  11/1966  United Kingdom .............. 8/10.2

1,949,749  4/1971  Germany .................. 8/10.2

Primary Examiner—Albert T. Meyers
Assistant Examiner—Vera C. Clarke
Attorney, Agent, or Firm—Cushman, Darby & Cushman

[57] ABSTRACT

A dye composition for keratinic fibers comprising in combination a. at least one oxidation base selected from the group consisting of an aromatic or heterocyclic compound carrying either two amino groups or one amino group and one hydroxy group, fixed in para position relative to each other on the aromatic or heterocyclic nucleus of said compound, said oxidation base being in the form of a free base or in the form of an acid addition salt thereof and b. at least one coupler of the formula:

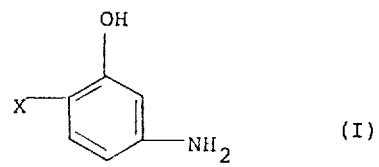

wherein X represents a member selected from the group consisting of F, Cl or Br; or the acid addition salt of the compound of formula (I).

17 Claims, No Drawings

DYE COMPOSITION FOR KERATINIC FIBERS CONTAINING AN OXIDATION BASE AND A META-AMINOPHENOL COUPLER

The use in dye compositions for keratinic fibers and especially for living human hair of paraphenylenediamines, paraaminophenols and even certain heterocyclic compounds, such as 2,5-diamino pyridine or 2-hydroxy-5-amino pyridine, is quite well known. These compounds are frequently designated as "oxidation bases" and are generally utilized in combination with compounds designated as "couplers."

These "couplers" react in an oxidizing medium with the "oxidation bases" to produce dyes which impart to the fibers or to living human hair a great variety of shades, depending upon the chemical structure of the two reactants. In general, the couplers are metadiamines, metaaminophenols, metadiphenols, metaacetylaminophenols, metaureidophenols, pyrazolones or even pyridine derivatives, such as 2,6-diamino pyridine.

The choice of the coupler is motivated not only by the shade desired, but also to a large extent by the degree of stability of the shade to light and to weather. For example, the progressive turning to red of violet and blue shades obtained with paraphenylenediamines and metadiamines is well known as an extremely inconvenient and highly undesirable phenomenon.

An object of the present application is the provision of a dye composition for keratinic fibers and in particular for living human hair which overcomes the above noted disadvantages, said composition comprising in combination a. at least one oxidation base selected from the group consisting of an aromatic or heterocyclic compound carrying either two amino groups or an amino group and a hydroxy group, fixed in para position relative to each other on the aromatic or heterocyclic nucleus of said compound, said oxidation base being in the form of a free base or in the form of an acid addition salt thereof;

b. and at least one coupler of the formula

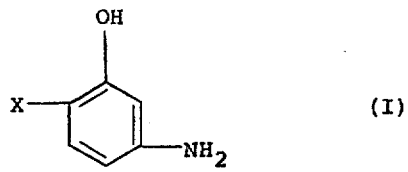

wherein X represents a member selected from the group consisting of F, Cl and Br, or the acid addition salt of the compound of formula (I). Preferably the aromatic nucleus is phenyl and the heterocyclic nucleus is pyridyl.

When as the oxidation base there is employed various paraphenylenediamines, the resulting dye composition provides a large range of shades which are stable to light and to weather. This range covers purples, blues and greens.

The influence of the chemical structure of the paraphenylenediamine used on the coloration obtained is particularly marked when compounds (I) as defined above are used as the coupler, which explains the very interesting extent of the range of shades obtained.

Representative paraphenylenediamines usefully employed as the oxidation base in the present invention include paraphenylenediamine, paratoluylenediamine, methoxyparaphenylenediamine, chloroparaphenylenediamine, 2,6-dimethylparaphenylenediamine, 2,5-dimethylparaphenylenediamine, 2-methyl-5-methoxyparaphenylenediamine, 2,6-dimethyl-5-methoxyparaphenylenediamine, N,N-dimethylparapehnylenediamine, 3-methyl-4-amino-N,N-diethylaniline, N,N-di--hydroxyethylparaphenylenediamine, 3-methyl-4-amino-N,N-di--hydroxyethylaniline, 3-chloro-4-amino-N,N-di--hydroxyethylaniline, 4-amino-N,N-(ethyl, carbamylmethyl) aniline, 3-methyl-4-amino-N,N-(ethyl, carbamylmethyl) aniline, 4-amino-N,N-(ethyl, piperidinoethyl) aniline, 3-methyl-4-amino-N,N-(ethyl, piperidinoethyl) aniline, 4-amino-N,N,(ethyl, morpholinoethyl) aniline, 3-methyl-4-amino-N,N-(ethyl, morpholinoethyl) aniline, 3-methyl-4-amino-N,N-(ethyl, acetylaminoethyl) aniline, 4-amino-N,N-(ethyl, acetylaminoethyl) aniline, 4-amino-N,N-(ethyl, mesylaminoethyl) aniline, 3-methyl-4-amino-N,N-(ethyl, mesylaminoethyl) aniline, 4-amino-N,N-(ethyl, -sulfoethyl) aniline, N-[(4-amino) phenyl] morpholine, N-[(4-amino) phenyl] piperidine, and 3-methyl-4-amino-N,N-(ethyl, -sulfoethyl) aniline.

These "oxidation bases" can be introduced into the dye composition in the form of the free base or in the form of an acid addition salt, for example, in the form of the hydrochloride, the hydrobromide or the sulfate thereof.

The couplers of formula (I), utilized in combination with a second important class of oxidation bases, i.e. paraaminophenols, also provide the advantage of giving, in the presence of an oxidizing agent, colors which are very stable to light and to weather. The colors obtained are golds, mahoganies, and more or less coppery chestnuts.

The combination of the couplers of formula (I) with both paraphenylenediamines and paraaminophenols provides gray shades of good stability.

Representative paraaminophenols usefully employed in the present invention include paraaminophenol, 2-methyl-4-amino phenol, 3-methyl-4-amino phenol, 2-chloro-4-amino phenol, 3-chloro-4-amino phenol, 2,6-dimethyl-4-amino phenol, 3,5-dimethyl-4-amino phenol, 2,3-dimethyl-4-amino phenol, and 2,5-dimethyl-4-amino phenol.

There can also be used with the coupler of formula I oxidation bases having a heterocyclic nucleus including 2,5-diaminopyridine and 2-hydroxy-5-aminopyridine.

All the oxidation bases can be used in their free form or in the form of salts such as the hydrochloride, the hydrobromide and sulfate salt thereof.

The dye compositions according to the invention are characterized by the following essential features:

The invention also relates to a meta-aminophenol of the formula

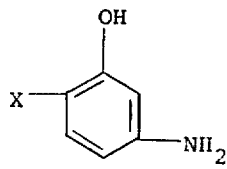

wherein X is F or Cl.

a. they must contain at least one of the compounds of the formula (I);

b. they must contain a paraphenylenediamine or a paraaminophenol or a heterocyclic oxidation base such as 2,5-diaminopyridine or 2-hydroxy-5-aminopyridine;

c. they can contain, in addition to coupler (I), other known couplers such as: resorcin, metaaminophenol, 2,4-diaminoanisole, 7-hydroxyphenomorpholine, 2-methyl-5-ureidophenol, 2,6-dimethyl-5-aminophenol, 2-methyl-5-acetylaminophenol, 3-amino-4-methoxyphenol, and the pyrazolones;

d. they can contain several oxidation bases;

e. they can also contain dyes in the form of leucoderivatives, in particular diphenylamines substituted in the 4 and 4 position by $NH_2$ or OH groups as well as other various substituents on the two benzene rings, which diphenylamines on oxidation produce indamines, indoanilines or indophenols;

f. they can also contain direct dyes such as azo dyes, anthraquinones, nitrobenzene dyes, indamines, indoanilines or indophenols; and g. they can be utilized in the form of an aqueous or hydroalcoholic solution containing a lower alkanol, preferably ethanol or isopropanol.

The dye composition of the present invention can also contain other solvents such as glycols, for example butylglycol, monomethyl ester of diethylene glycol, etc., wetting agents or surfactants such as the sulfates of fatty alcohols, the ethanolamides of fatty acids, polyoxyethylenated fatty acids and alcohols, thickening agents such as carboxymethylcellulose, higher fatty alcohols, cosmetic polymers such as the polymers and copolymers of polyvinylpyrrolidone, polymers of acrylic acid, perfumes, complexing agents, reducing agents, alkalizing agents, for example, ammonia and ethanolamines, acidifying agents such as phosphoric acid, lactic acid and acetic acid.

The aggregate of the oxidation bases, couplers, dyes and leucoderivatives included in the composition, as defined previously, represents from 0.3 to 5 percent by weight with respect to the total weight of the composition.

The couplers can be used in an amount practically molar with respect to the oxidation bases. However, it is often advantageous to use an excess of the oxidation base, for example, 5 moles of oxidation base per mole of coupler. This does not exclude, however, the use in certain cases of an excess of coupler with respect to the oxidation base. For example, 2 moles of coupler per mole of oxidation base can be used. Generally, the ratio of oxidation base : coupler is between about 10:1 and 1:4, preferably between 6:1 and 1:2 and more preferably about 1:1.

The concentration of the coupler (I) can vary between 0.05 and 3 percent by weight of the total composition.

The pH of the dye compositions of the present invention can vary between 5 and 11, and preferably between 8 and 10.

The dye compositions according to the invention are used in a conventional manner. Thus after addition of an oxidizing agent to the composition, the resulting mixture is applied to the hair and is permitted to remain in contact therewith for a period of about 10 to 30 minutes, at a temperature between 15 and 35C. Thereafter the hair is rinsed, washed and dried.

The oxidizing agent utilized is most often $H_2O_2$ although other oxidizing agents such as urea peroxide and persalts, such as persulfates and perborates, can also be used.

The present invention also relates to a new compound of formula (I):

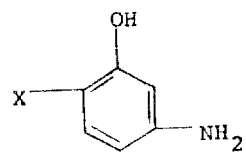

in which X represents fluorine or chlorine.

The following examples illustrate the present invention. Unless otherwise stated, all parts and percentages are by weight.

EXAMPLE A 2-chloro-5-aminophenol is prepared in accordance with the following reaction scheme:

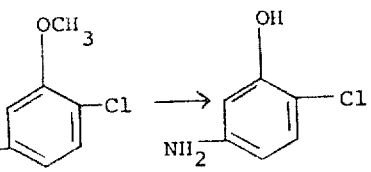

FIRST STEP:

Preparation of 2-chloro-5-nitro anisole starting with 2-amino-5-nitro anisole by diazotation of the amine and decomposition of the diazonium salt in the presence of copper chloride.

One mole (168 g) of 2-amino-5-nitro anisole is introduced into 1.68 liters of acetic acid. To the resulting solution there is added, little by little, with agitation and while maintaining the temperature at about 15C, 1 mole (69 g) of sodium nitrite in solution in 483 cc of concentrated sulfuric acid. The resulting solution of the diazonium salt is then filtered and, after raising its temperature to about 95C, it is added over a period of 10 minutes to a hydrochloric solution of copper chloride obtained by dissolving 1.1 mole (218 g) of $Cu_2Cl_2$ in 3.5 liters of hydrochloric acid (d = 1.16) which has previously been heated to 95C. At the end of 15 minutes the evolution of nitrogen ceases and the reaction mixture is cooled to 0C. Thereafter the 2-chloro-5-nitro anisole (159 g) which melts at 82C is recovered from the reaction mixture by filtration.

SECOND STEP:

Preparation of 2-chloro-5-amino anisole by reducing 2-chloro-5-nitro anisole.

1.23 kg of powdered iron are introduced into 6.56 liters of water to which has been added 0.94 liter of acetic acid, previously heated to a temperature of 70C. There are then added, little by little and with agitation, 5 moles (937.5 g) of 2-chloro-5-nitro anisole. The addition is so controlled that the temperature of the reaction mixture is maintained at about 100C. When the reduction is terminated, the reaction mixture is cooled to 0C, and there are added thereto 1.65 liters of 1N NaOH. The reaction mixture is then filtered and the mother liquor is discarded. The resulting filtrate which is a mixture of iron slimes and the desired product is treated twice with 3 liters of acetone at reflux. After each treatment the mixture is filtered and the combined filtrates are concentrated under a vacuum to produce a residual volume of 1.5 liters which is then diluted with 3 liters of ice water to precipitate the 2-chloro-5-amino anisole. After filtering the same there are obtained 669 g of product which melts at 79C.

THIRD STEP:

Preparation of 2-chloro-5-amino phenol.

4.35 moles (688 g) of 2-chloro-5-amino anisole are introduced into 3.44 liters of hydrobromic acid (d = 1.49) to which has been added 1.38 liters of acetic acid.

The resulting mixture is then heated for 3 hours at reflux at which time it is cooled to 0C. The 2-chloro-5-aminophenol hydrobromide that has precipitated is then filtered, introduced into three liters of ice water and neutralized with concentrated ammonia so as to precipitate 2-chloro-5-aminophenol. The desired product which is then filtered to provide a yield of 495 g exhibits, after drying, a melting point of 160C.

| Analysis | Calculated for $C_6H_6ON\ Cl$ | | Found |
|---|---|---|---|
| C% | 50.17 | 49.98 | 50.02 |
| H% | 4.11 | 4.27 | 4.32 |
| N% | 9.76 | 9.69 | 9.78 |

2-fluoro-5-aminophenol is prepared in a similar manner.

EXAMPLES OF USE

Example 1

The following dye composition is prepared:

| Dihydrochloride of para-phenylenediamine | 0.45 g |
|---|---|
| 2-chloro-5-aminophenol | 0.36 g |
| Sodium laurylsulfate with 19% of the starting alcohol being oxyethylenated | 20 g |
| Ethylene diamine tetraacetic acid sold under the tradename "Trilon B" | 0.2 g |
| Water, q.s.p. | 100 g |
| Ammonia (22Be) q.s.p. | pH = 9 |

To this solution there are added 100 g of $H_2O_2$ (20 volumes). The resulting mixture is then applied for a period of 20 minutes at 20C to 95 percent naturally white hair. After rinsing and shampooing there is obtained a very strong purplish violet coloration.

The phrase "sodium laurylsulfate with 19 percent of the starting alcohol being oxyethylenated" means a mixture constituted by 19 percent of dodecyl alcohol oxyethylenated with 2 moles of ethylene oxide and by 81 percent of the sodium sulfate salt of this same oxyethylenated alcohol.

Example 2

The following dye composition is prepared:

| Dihydrochloride of para-toluylenediamine | 2.44 g |
|---|---|
| 2-chloro-5-aminophenol | 0.36 g |
| Sodium laurylsulfate with 19% of the starting alcohol being oxyethylenated | 20 g |
| Ethylenediamine tetraacetic acid | 0.2 g |
| Water, q.s.p. | 100 g |
| Ammonia (22 Be) q.s.p. | pH = 10 |

To this solution there are added 100 g of $H_2O_2$ (20 volumes) and the resulting mixture is applied for a period of 15 minutes at ambient temperature to 95 percent naturally white hair. After rinsing and shampooing there is obtained a violet dark grey coloration.

EXAMPLE 3

The following dye composition is prepared:

| Dihydrochloride of 2,5-dimethyl paraphenylenediamine | 0.53 g |
|---|---|
| Hydrochloride of 2-chloro-5-aminophenol | 0.45 g |
| Sodium laurylsulfate with 19% of the starting alcohol being oxyethylenated | 20 g |
| Ethylenediamine tetraacetic acid | 0.2 g |
| Ammonia (22 Be) q.s.p. | pH = 8 |
| Water, q.s.p. | 100 g |

To this solution there is added an equal weight of $H_2O_2$ (20 volumes). The resulting mixture is then applied for a period of 20 minutes at ambient temperature to 95 percent naturally white hair. After rinsing and shampooing, there is obtained a deep blue-grey coloration.

EXAMPLE 4

The following dye composition is prepared:

| Sulfate of 3-methyl-4-amino-N,N-(ethyl, mesylaminoethyl) aniline | 1.96 g |
|---|---|
| 2-chloro-5-aminophenol | 0.64 g |
| Ethanol (96) | 20 g |
| Water, q.s.p. | 100 g |
| Triethanolamine, q.s.p. | pH = 8 |

To this solution there are added 80 g of $H_2O_2$ (20 volumes). The resulting mixture is then applied for a period of 20 minutes at ambient temperature to bleached hair. After rinsing and shampooing, there is obtained an intense turquoise blue coloration.

EXAMPLE 5

The following dye composition is prepared:

| Dihydrochloride of 2,6-dimethyl-5-methoxy paraphenylenediamine | 0.59 g |
|---|---|
| 2-chloro-5-aminophenol | 0.36 g |
| Sodium laurylsulfate with 19% of the starting alcohol being oxyethylenated | 20 g |
| Ethylenediamine tetraacetic acid | 0.2 g |
| Sodium bisulfite (40% solution) | 1 g |
| Ammonia (22 Be) | 10 g |
| Water, q.s.p. | 100 g |

To this solution which has a pH of 10.3, there are added 100 g of $H_2O_2$ (20 volumes). The resulting mixture is then applied for a period of 20 minutes at ambient temperature to 95 percent naturally white hair. After rinsing and shampooing, there is obtained a slivery blue-grey coloration.

EXAMPLE 6

The following dye composition is prepared:

| | |
|---|---|
| Monohydrochloride of 3-methyl-4-amino-N,N-diethylaniline | 0.22 g |
| 2-chloro-5-aminophenol | 0.14 g |
| Ethanol (96) | 25 g |
| Ammonia, q.s.p. | pH = 6.5 |
| Water, q.s.p. | 100 g |

To this solution there are added 100 g of $H_2O_2$ (20 volumes). The resulting mixture is then applied for a period of 30 minutes at ambient temperature to 95 percent naturally white hair. After rinsing and shampooing, there is obtained a pale silvery blue-green coloration.

EXAMPLE 7

The following dye composition is prepared:

| | |
|---|---|
| N-[(4-amino) phenyl] morpholine | 0.89 g |
| 2-chloro-5-aminophenol | 0.72 g |
| Carboxymethylcellulose | 10 g |
| Water, q.s.p. | 100 g |
| Ammonia (22 Be) q.s.p. | pH = 10 |

To this solution there are added 100 g of a 10 percent solution of urea peroxide. The resulting mixture is then applied at ambient temperature for a period of 15 minutes to bleached hair. After rinsing and shampooing, there is obtained a light parme coloration.

EXAMPLE 8

The following dye composition is prepared:

| | |
|---|---|
| Sulfate of 3-methyl-4-amino-N,N-(ethyl, mesylaminoethyl) aniline | 0.81 g |
| 2-chloro-5-aminophenol | 0.22 g |
| 2-chloro-5-ureidophenol | 0.28 g |
| Lauryl alcohol oxyethylenated with 10.5 moles of ethyleneoxide | 5 g |
| Butylglycol | 5 g |
| Water, q.s.p. | 100 g |
| Ammonia (22 Be) q.s.p. | pH = 9 |

To this solution there are added 100 g of $H_2O_2$ (20 volumes). The resulting mixture is then applied for a period of 20 minutes at 30C to 95 percent naturally white hair. After rinsing and shampooing, there is obtained a light pearly emerald-green coloration.

EXAMPLE 9

The following dye composition is prepared:

| | |
|---|---|
| Dihydrochloride of 2-methyl-5-methoxy paraphenylenediamine | 0.56 g |
| Resorcin | 0.14 g |
| 2-chloro-5-aminophenol | 0.18 g |
| Nitroparaphenylenediamine | 0.03 g |
| Sodium laurylsulfate with 19% of the starting alcohol being oxyethylenated | 20 g |
| Ethylenediamine tetraacetic acid | 0.2 g |
| Ammonia (22 Be) | 10 g |
| Water, q.s.p. | 100 g |

To this solution having a pH of 9.5, there are added 100 g of $H_2O_2$ (20 volumes). The resulting mixture is then applied for a period of 25 minutes at ambient temperature to 95 percent naturally white hair. After rinsing, shampooing and drying there is obtained a lightly rose blue-gray coloration.

EXAMPLE 10

The following dye composition is prepared:

| | |
|---|---|
| 4-amino-N,N-dihydroxyethylaniline | 0.49 g |
| 2-chloro-5-aminophenol | 0.36 g |
| Ammonium lauryl sulfate | 10 g |
| Ammonia (22 Be) q.s.p. | pH = 7 |
| Water, q.s.p. | 100 g |

To this solution there are added 50 g of $H_2O_2$ (20 volumes). The resulting mixture is then applied for a period of 15 minutes at ambient temperature to 95 percent naturally white hair. After rinsing and shampooing, there is obtained a silvery green coloration.

EXAMPLE 11

The following dye composition is prepared:

| | |
|---|---|
| Sulfate of N-[(4-amino) phenyl] piperidine | 0.45 g |
| 2-chloro-5-aminophenol | 1.43 g |
| Sodium laurylsulfate with 19% of the starting alcohol being oxyethylenated | 20 g |
| Ethylenediamine tetraacetic acid | 0.2 g |
| Ammonia (22 Be) | 10 g |
| Water, q.s.p. | 100 g |

To this solution having a pH of 9.3 there are added 100 g of $H_2O_2$ (20 volumes). The resulting mixture is then applied for a period of 10 minutes at ambient temperature to bleached hair. After rinsing and shampooing, there is obtained a silvery blue-grey coloration with mauve glints.

EXAMPLE 12

The following dye composition is prepared:

| | |
|---|---|
| Dihydrochloride of 2-methyl-5-methoxyparaphenylenediamine | 0.56 g |
| 2-chloro-5-aminophenol | 0.36 g |
| Ethanol (96) | 30 g |
| Ammonia (22 Be) q.s.p. | pH = 9 |
| Water, q.s.p. | 100 g |

To this solution there are added 100 g of $H_2O_2$ (20 volumes). The resulting mixture is then applied at 20C for a period of 20 minutes to 95 percent naturally white hair. After rinsing and shampooing, there is obtained an intense Frenchblue coloration.

EXAMPLE 13

The following dye composition is prepared:

| | |
|---|---|
| 3-methyl-4-amino-N,N-(ethyl-sulfoethyl) aniline | 2.58 g |
| 2-chloro-5-aminophenol | 1.45 g |
| Ammonia (22 Be) q.s.p. | pH = 10 |
| Water, q.s.p. | 100 g |

To this solution there are added 80 g of $H_2O_2$ (20 volumes). The resulting mixture is then applied for a period of 25 minutes at ambient temperature to 95 percent naturally white hair. After rinsing and shampooing, there is obtained a silvery emerald green coloration.

EXAMPLE 14

The following dye composition is prepared:

4-amino-N,N-(ethyl, carbamylmethyl)

-continued

| | |
|---|---|
| aniline | 0.29 g |
| 2-chloro-5-aminophenol | 0.22 g |
| Diethanolamides of fatty acids of coprah | 10 g |
| Ammonia (22 Be) q.s.p. | pH = 10 |
| Water, q.s.p. | 100 g |

To this solution there are added 100 g of a 0.7 percent aqueous solution of ammonium persulfate. The resulting mixture is then applied for a period of 10 minutes at a temperature of about 20C to 95 percent naturally white hair. After rinsing and shampooing, there is obtained a silvery-grey coloration.

EXAMPLE 15

The following dye composition is prepared:

| | |
|---|---|
| Dihydrochloride of 2-methyl-5-methoxy paraphenylenediamine | 0.22 g |
| 2-chloro-5-aminophenol | 0.20 g |
| 1-aminopropylamino anthraquinone | 0.05 g |
| N-[(4-hydroxy) phenyl]-3-amino-6-methyl benzoquinoneimine | 0.05 g |
| Butylglycol | 5 g |
| Lauryl alcohol oxyethylenated with 10.5 moles of ethylene oxide | 5 g |
| Ammonia (22 Be) q.s.p. | pH = 9 |
| Water, q.s.p. | 100 g |

To this solution there are added 100 g of $H_2O_2$ (20 volumes). The resulting mixture is then applied for a period of 20 minutes at ambient temperature to 95 percent naturally white hair. After rinsing and shampooing, there is obtained a rose-grey coloration.

EXAMPLE 16

The following dye composition is prepared:

| | |
|---|---|
| Dihydrochloride of 2,6-dimethyl paraphenylenediamine | 0.53 g |
| 2-chloro-5-aminophenol | 0.06 g |
| Resorcin | 0.20 g |
| 3-chloro-4-aminophenol | 0.14 g |
| Ethanol (96) | 25 g |
| Ammonia (22 Be) q.s.p. | pH = 8.5 |
| Water, q.s.p. | 100 g |

To this solution there are added 100 g of $H_2O_2$ (20 volumes). The resulting mixture is then applied for a period of 20 minutes at ambient temperature to bleached hair. After rinsing and shampooing, there is obtained a smoke grey coloration.

EXAMPLE 17

The following dye composition is prepared:

| | |
|---|---|
| Trihydrochloride of 4-amino-N,N-(ethyl, piperidinoethyl) aniline | 1.28 g |
| 2-chloro-5-aminophenol | 0.72 g |
| Butylglycol | 5 g |
| Lauryl alcohol oxyethylenated with 10.5 moles of ethylene oxide | 5 g |
| Triethanolamine, q.s.p. | pH = 5 |
| Water, q.s.p. | 100 g |

To this solution there are added 60 g of $H_2O_2$ (20 volumes). The resulting mixture is then applied for a period of 10 minutes at 20C to 95 percent naturally white hair. After rinsing and shampooing, there is obtained a light grey coloration.

EXAMPLE 18

The following dye composition is prepared:

| | |
|---|---|
| Dihydrochloride of para-toluylenediamine | 2.44 g |
| Dihydrochloride of 2,6-dimethyl-5-methoxy paraphenylenediamine | 0.6 g |
| 2-chloro-5-aminophenol | 0.72 g |
| 7-hydroxy phenomorpholine | 0.40 g |
| Sodium laurylsulfate with 19% of the starting alcohol being oxyethylenated | 20 g |
| Ethylenediamine tetraacetic acid | 0.2 g |
| Ammonia (22 Be) q.s.p. | pH = 9 |
| Water, q.s.p. | 100 g |

To this solution there are added 100 g of $H_2O_2$ (20 volumes). The resulting mixture is then applied for a period of 25 minutes at 25C to 95 percent naturally white hair. After rinsing and shampooing, there is obtained a violet blueblack coloration.

EXAMPLE 19

The following dye composition is prepared:

| | |
|---|---|
| Dihydrochloride of methoxy paraphenylenediamine | 2.11 g |
| 2-chloro-5-aminophenol | 0.36 g |
| 7-hydroxy phenomorpholine | 0.38 g |
| Ethanol (96) | 30 g |
| Water, q.s.p. | 100 g |
| Triethanolamine, q.s.p. | pH = 8.5 |

To this solution there are added 100 g of $H_2O_2$ (20 volumes). The resulting mixture is then applied for a period of 15 minutes at ambient temperature to 95 percent naturally white hair. After rinsing and shampooing there is obtained an extremely dark blue-green coloration.

EXAMPLE 20

The following dye composition is prepared:

| | |
|---|---|
| 3-chloro-4-aminophenol | 0.57 g |
| 2-chloro-5-aminophenol | 0.57 g |
| Carboxymethylcellulose | 5 g |
| Triethanolamine, q.s.p. | pH = 8.5 |
| Water, q.s.p. | 100 g |

To this solution there are added 25 g of $H_2O_2$ (20 volumes). The resulting mixture is then applied for a period of 20 minutes at ambient temperature to bleached hair. After rinsing and shampooing there is obtained a salmon coloration.

EXAMPLE 21

The following dye composition is prepared:

| | |
|---|---|
| Dihydrochloride of 2,5-diamino pyridine | 0.72 g |
| 2-chloro-5-aminophenol | 0.36 g |
| Carboxymethylcellulose | 10 g |
| Water, q.s.p. | 100 g |
| Ammonia (22 Be) q.s.p. | pH = 7.5 |

To this solution there are added 100 g of $H_2O_2$ (20 volumes). The resulting mixture is then applied for a period of 20 minutes at ambient temperature to bleached hair. After rinsing and shampooing, there is obtained a copper coloration.

EXAMPLE 22

The following dye composition is prepared:

| | |
|---|---|
| Paraaminophenol | 0.54 g |
| 2-chloro-5-aminophenol | 0.72 g |
| Ethanol (96) | 20 g |
| Ammonia (22 Be) | pH = 8.5 |
| Water, q.s.p | 100 g |

To this solution there are added 75 g of $H_2O_2$ (20 volumes). The resulting mixture is then applied for a period of 30 minutes at 20C to 95 percent naturally white hair. After rinsing and shampooing there is obtained a light coppery chestnut coloration.

EXAMPLE 23

The following dye composition is prepared:

| | |
|---|---|
| Dihydrochloride of 2-methyl-5-methoxy phenylenediamine | 0.42 g |
| 2-chloro-5-aminophenol | 0.42 g |
| Nonylphenol oxyethylenated with 9 moles of ethylene oxide | 30 g |
| Ammonia (22 Be) q.s.p. | pH = 9 |
| Water, q.s.p | 100 g |

To this solution there are added 100 g of $H_2O_2$ (20 volumes). The resulting mixture is then applied to 95 percent naturally white hair for a period of 20 minutes at ambient temperature. After rinsing and shampooing there is obtained a silvery blue coloration.

EXAMPLE 24

The following dye composition is prepared:

| | |
|---|---|
| 3-methyl-4-aminophenol | 0.12 g |
| 2-chloro-5-aminophenol | 0.07 g |
| Ammonium alkyl sulfate wherein the alkyl moiety has 12-14 carbon atoms (not oxyethylenated) | 15 g |
| Lauryl alcohol oxyethylenated with 10.5 moles of ethylene oxide | 5 g |
| Ammonia (22 Be) | 10 g |
| Water, q.s.p. | 100 g |

To this solution having a pH of 10, there are added 100 g of a 0.7 percent aqueous solution of ammonium persulfate. The resulting mixture is then applied for a period of 30 minutes at ambient temperature to bleached hair. After rinsing and shampooing there is obtained a golden sand coloration.

EXAMPLE 25

The following dye composition is prepared:

| | |
|---|---|
| Dihydrochloride of paraphenylenediamine | 0.54 g |
| 2-chloro-5-aminophenol | 0.36 g |
| The quaternary copolymer of polyvinyl pyrrolidone having an average molecular weight of 100,000 and sold under the mark "Gafquate 734" | 5 g |
| Ethanol (96) | 30 g |
| Water, q.s.p. | 100 g |
| Triethanolamine, q.s.p. | pH = 8 |

To this solution there are added 50 g of $H_2O_2$ (20 volumes). The resulting mixture is then applied for a period of 15 minutes at ambient temperature to 95 percent naturally white hair. After rinsing and shampooing there is obtained a dark violet coloration.

EXAMPLE 26

The following dye composition is prepared:

| | |
|---|---|
| Hydrochloride of 2-chloro-4-aminophenol | 0.90 g |
| 2-chloro-5-aminophenol | 0.72 g |
| Monomethylester of diethylene glycol | 10 g |
| Ammonia (22 Be) q.s.p. | pH = 10 |
| Water, q.s.p. | 100 g |

To this solution there are added 75 g of $H_2O_2$ (20 volumes). The resulting mixture is then applied for a period of 10 minutes at ambient temperature to 95 percent naturally white hair. After rinsing and shampooing there is obtained a beige coloration.

EXAMPLE 27

The following dye composition is prepared:

| | |
|---|---|
| Paraaminophenol | 0.65 g |
| 2-chloro-5-aminophenol | 0.86 g |
| 4-hydroxy-4-amino-3,5-dimethyl diphenylamine hydrochloride | 0.80 g |
| Ethanol (96) | 30 g |
| Ammonia (22 Be) q.s.p. | pH = 8.3 |
| Water, q.s.p. | 100 g |

To this solution there is added an equal weight of $H_2O_2$. The resulting mixture is then applied for a period of 20 minutes at ambient temperature to 95% naturally white hair. After rinsing and shampooing, there is obtained a chestnut coloration with mahogany glints.

EXAMPLE 28

The following dye composition is prepared:

| | |
|---|---|
| Dihydrochloride of 2,5-dimethyl paraphenylenediamine | 0.50 g |
| 2-chloro-5-aminophenol | 0.36 g |
| 4,4-dihydroxy-3-methyl-6-amino diphenylenediamine | 0.85 g |
| Butylglycol | 2.5 g |
| Lauryl alcohol oxyethylenated with 10.5 moles of ethylene oxide | 2.5 g |
| Ammonia (22 Be) q.s.p. | pH = 9.5 |
| Water, q.s.p | 100 g |

To this solution there are added 70 g of $H_2O_2$ (20 volumes). The resulting mixture is then applied for a period of 15 minutes at ambient temperature to 95 percent naturally white hair. After rinsing and shampooing, there is obtained a light ash chestnut coloration.

EXAMPLE 29

The following dye composition is prepared:

| | |
|---|---|
| Dihydrochloride of 2,6-dimethyl-3-methoxy paraphenylenediamine | 0.22 g |
| 2-bromo-5-aminophenol | 0.18 g |
| Sodium laurylsulfate with 19% of the starting alcohol being oxyethylenated | 10 g |
| Ethylenediamine tetraacetic acid | 0.2 g |
| Sodium bisulfite (40% solution) | 1 g |
| Ammonia (22 Be) | 10 g |
| Water, q.s.p. | 100 g |

To this solution which has a pH of 11, there are added 100 g of a 0.44 percent aqueous solution of ammonium persulfate. The resulting mixture is then applied for a period of 25 minutes at ambient temperature to bleached hair. After rinsing and shampooing, there is obtained a light silvery blue coloration.

EXAMPLE 30

The following dye composition is prepared:

| | |
|---|---|
| 4-amino-N-ethyl-N-carbamyl-methyl aniline | 0.58 g |
| 2-bromo-5-aminophenol | 0.56 g |
| Polymer of acrylic acid - average molecular weight between 2 and 3 million | 3.5 g |
| Ethanol (96) | 30 g |
| Triethanolamine q.s.p. | pH = 6 |
| Water, q.s.p. | 100 g |

To this solution there are added 60 grams of $H_2O_2$ (20 volumes). The resulting mixture is then applied for a period of 15 minutes at ambient temperature to 95% naturally white hair. After rinsing and shampooing there is obtained a deep blue-grey coloration.

EXAMPLE 31

The following dye composition is prepared:

| | |
|---|---|
| Dihydrochloride of para-toluylenediamine | 0.87 g |
| 2-bromo-5-aminophenol | 0.94 g |
| Lauryl alcohol oxyethylenated with 10.5 moles of ethylene oxide | 5 g |
| Butylglycol | 5 g |
| Ammonia (22 Be) q.s.p. | pH = 9.5 |
| Water, q.s.p. | 100 g |

To this solution there are added 70 g of $H_2O_2$ (20 volumes). The resulting mixture is then applied for a period of 15 minutes at 20C to 95 percent naturally white hair. After rinsing and shampooing, there is obtained an intense violet blue coloration.

EXAMPLE 32

The following dye composition is prepared:

| | |
|---|---|
| Paraaminophenol | 1.09 g |
| 2-bromo-5-aminophenol | 1.88 g |
| Ethanol (96) | 25 g |
| Ammonia (22 Be) q.s.p. | pH = 9 |
| Water, q.s.p. | 100 g |

To this solution there are added 50 g of $H_2O_2$ (20 volumes). The resulting mixture is then applied for a period of 20 minutes at ambient temperature to 95 percent naturally white hair. After rinsing and shampooing there is obtained an intense red copper coloration.

EXAMPLE 33

The following dye composition is prepared:

| | |
|---|---|
| Ammonium salt of 4-amino-N-ethyl-N-sulfoethyl aniline | 1.65 g |
| 2-bromo-5-aminophenol | 1.12 g |
| Diethanolamides of fatty acids of coprah | 10 g |
| Ammonia (22 Be) q.s.p. | pH = 10.5 |
| Water, q.s.p. | 100 g |

To this solution there are added 100 g of a 10 percent aqueous urea peroxide solution. The resulting mixture is then applied for a period of 20 minutes at ambient temperature to bleached hair. After rinsing and shampooing there is obtained a very luminous light blue coloration.

What is claimed is:

1. A dye composition for keratinic fibers comprising in combination in an aqueous or hydroalcoholic solution
   a. at least one oxidation base selected from the group consisting of an aromatic and heterocyclic compound carrying either two amino groups or one amino group and one hydroxy group, fixed in para amino group and one hydroxy group, fixed in para position relative to each other or the aromatic or heterocyclic nucleus of said compound, said oxidation base being in the form of a free base or in the form of an acid addition salt thereof and
   b. at least one coupler of the formula:

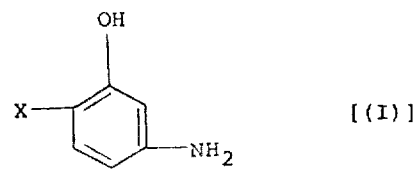

wherein X represents a member selected from the group consisting of F, Cl and Br; or the acid addition salt thereof, said coupler being present in an amount of 0.05–3 percent based on the total weight of the composition and the molar ratio of said oxidation base to said coupler being between 6:1 and 1:2.

2. The composition of claim 1 wherein said oxidation base is a paraphenylenediamine in the form of a free base or in the form of a salt.

3. The composition of claim 2 wherein said paraphenylenediamine is selected from the group consisting of
paraphenylenediamine,
paratoluylenediamine,
methoxyparaphenylenediamine,
chloroparaphenylenediamine,
2,6-dimethyl paraphenylenediamine,
2,5-dimethyl paraphenylenediamine,
2-methyl-5-methoxy paraphenylenediamine,
2,6-dimethyl-5-methoxy paraphenylenediamine,
N,N-dimethylparaphenylenediamine,
3-methyl-4-amino-N,N-diethylaniline,
N,N-di--hydroxyethyl paraphenylenediamine,
3-methyl-4-amino-N,N-di--hydroxyethylaniline,
3-chloro-4-amino-N,N,-di--hydroxyethylaniline,
4-amino-N,N-(ethyl, carbamylmethyl) aniline,
3-methyl-4-amino-N,N-(ethyl, carbamylmethyl) aniline,
4-amino-N,N-(ethyl, piperidinoethyl) aniline,
3-methyl-4-amino-N,N-(ethyl, piperidinoethyl)) aniline,
4-amino-N,N-(ethyl, morpholinoethyl) aniline,
3-methyl-4-amino-N,N-(ethyl, morpholinoethyl) aniline,
3-methyl-4-amino-N,N-(ethyl, acetylaminoethyl) aniline,
4-amino-N,N-(ethyl, acetylaminoethyl) aniline,
4-amino-N,N-(ethyl, mesylaminoethyl) aniline,
3-methyl-4-amino-N,N-(ethyl, mesylaminoethyl) aniline,
4-amino-N,N-(ethyl, -sulfoethyl) aniline and
3-methyl-4-amino-N,N-(ethyl, -sulfoethyl) aniline.

4. The composition of claim 1 wherein said oxidation base is a paraaminophenol in the form of a free base or in the form of a salt.

5. The composition of claim 4 wherein said paraaminophenol is selected from the group consisting of para-aminophenol,
2-methyl-4-aminophenol,
3-methyl-4-aminophenol,
2-chloro-4-aminophenol,
3-chloro-4-aminophenol,
2,6-dimethyl-4-aminophenol,
3,5-dimethyl-4-aminophenol,
2,3-dimethyl-4-aminophenol, and
2,5-dimethyl-4-aminophenol.

6. The composition of claim 1 wherein said oxidation base is selected from the group consisting of 2,5-diamino pyridine 2-hydroxy-5-amino pyridine and a salt thereof.

7. The composition of claim 1 which also includes at least one additional coupler.

8. The composition of claim 7 wherein said additional coupler is selected from the group consisting of resorcin, metaaminophenol, 2,4-diamino anisole, 7-hydroxy phenomorpholine, 2-methyl-5-ureido phenol, 2,6-dimethyl-5-aminophenol, 2-methyl-5-acetylamino phenol, 3-amino-4-methoxy phenol and a pyrazolone.

9. The composition of claim 1 which also includes a dye selected from the group consisting of an anthraquinone, a nitrobenzene, and an indophenol dye.

10. The composition of claim 1 which also includes a leuco derivative of an indophenol or a leuco derivative of an indoaniline.

11. The composition of claim 1 wherein said hydroalcoholic solution contains a lower alkanol.

12. The composition of claim 1 which also contains one or more of butyl glycol, monomethyl ester of diethylene glycol, wetting or washing agent, thickening agent, a polymer selected from the group consisting of polyvinylpyrrolidone and polyacrylic acid, ethylenediamine tetra acetic acid or sodium bisulfite.

13. The composition of claim 1 having a pH between 5 and 11.

14. The composition of claim 1 wherein said oxidation base is N-[(4-amino)phenyl] morpholine.

15. The composition of claim 1 wherein said oxidation base is N-[(4-amino)phenyl] piperidine.

16. A process for dyeing human hair consisting essentially of applying an effective amount of the dye composition of claim 1 in the presence of an oxidizing agent to the hair, rinsing, washing and drying the hair.

17. The process of claim 16 wherein said oxidizing agent is selected from the group consisting of $H_2O_2$, urea peroxide and a persalt.

* * * * *

UNITED STATES PATENT OFFICE
CERTIFICATE OF CORRECTION

Patent No. 3,918,896                    Dated November 11, 1975

Inventor(s) Gregoire Kalopissis and Andree Bugaut

It is certified that error appears in the above-identified patent and that said Letters Patent are hereby corrected as shown below:

<u>In the Heading</u>

Under [30] Foreign Application Priority Data, change "France.....73.67861" to

--Luxembourg.....67861--

Signed and Sealed this twenty-seventh Day of April 1976

[SEAL]

Attest:

RUTH C. MASON
Attesting Officer

C. MARSHALL DANN
Commissioner of Patents and Trademarks